United States Patent [19]
Langtry, II

[11] Patent Number: 5,967,315
[45] Date of Patent: Oct. 19, 1999

[54] PARTITIONED STORAGE TUBE FOR TIP-UPS AND OTHER ICE FISHING ACCESSORIES

[76] Inventor: Allen G. Langtry, II, 293 Watson Rd., Brier Hill, N.Y. 13614

[21] Appl. No.: 09/055,153

[22] Filed: Apr. 4, 1998

[51] Int. Cl.[6] .................................................. B65D 85/00
[52] U.S. Cl. ............... 206/315.11; 206/579; 43/54.1; 220/507; 220/553; 229/120.02; 229/125.37
[58] Field of Search ..................... 206/315.11, 579, 206/315.4, 315.3; 220/315, 657, 507, 555, 375, 553; 229/125.37, 125.38, 120.02, 120.07; 43/54.1

[56] References Cited

U.S. PATENT DOCUMENTS

| | | |
|---|---|---|
| D. 382,707 | 8/1997 | Wang . |
| D. 386,303 | 11/1997 | Wang . |
| 1,493,828 | 5/1924 | Stocks ................................. 206/315.4 |
| 1,570,510 | 1/1926 | McQuirk ............................. 206/315.4 |
| 1,726,245 | 8/1929 | Shelton .............................. 206/315.4 |
| 2,919,169 | 12/1959 | Jackson ................................. 220/553 |
| 3,128,812 | 4/1964 | Scheurer ............................. 206/315.4 |
| 4,277,000 | 7/1981 | Jaarsma .................................. 220/555 |
| 4,628,628 | 12/1986 | Burgin et al. . |
| 4,829,699 | 5/1989 | Perkins ................................... 43/54.1 |
| 5,207,321 | 5/1993 | Jones . |
| 5,209,280 | 5/1993 | Gevas ................................. 206/315.4 |
| 5,490,594 | 2/1996 | Rupe .................................. 206/315.4 |
| 5,507,332 | 4/1996 | McKinnon .......................... 206/315.4 |
| 5,558,259 | 9/1996 | Izzo .................................... 206/315.3 |
| 5,704,158 | 1/1998 | Whiteaker .......................... 206/315.11 |
| 5,755,057 | 5/1998 | Dancer .............................. 206/315.11 |

*Primary Examiner*—Paul T. Sewell
*Assistant Examiner*—Trinh Nguyen
*Attorney, Agent, or Firm*—Michael I. Kroll

[57] ABSTRACT

A partitioned storage tube for tip-ups and other ice fishing accessories including an elongated, cylindrical body partitioned into five separate tip-up storage compartments for storing and protecting tip-ups when not in use. A structure for protecting the tip-up reels is incorporated into the body. Elastic straps provide an adjustable means of securing a cover to the body. A cylindrical interior compartment is accessible through an access opening in the cover to store ice fishing accessories that may be longer than the tube. Drain apertures in the bottom of each tip-up storage compartment facilitate the removal of excess moisture. The storage tube is made of a durable plastic material so it could be used as a stool when standing upright with the cover on.

11 Claims, 5 Drawing Sheets

PARTITIONED STORAGE TUBE FOR TIP-UPS AND OTHER ICE FISHING ACCESSORIES

BACKGROUND OF THE INVENTION

1. Field of the Invention

The present invention relates generally to storage containers and, more specifically, to a partitioned storage tube for tip-ups and other ice fishing accessories.

A tip-up is an ice fishing tool which has a vertical post with a signaling mechanism on top and a reel and line on the bottom. Once a hole is chopped in the ice a fisherman places the lower portion of the tip-up in the hole supported by a cross-bracing method to keep the reel submerged to prevent freezing. When a fish pulls at the line, the signaling method pops up to alert the fisherman that there is activity at the hole. Using tip-ups allows a fisherman to set up and monitor several lines simultaneously. Since more than one tip-up is generally used at a given time, the present invention addresses the difficulty of transporting several tip-ups at a time without damaging reels or tangling lines among other problems. The partitioned storage tube provides an organized, safe, and convenient means to store and transport all the equipment needed for ice-fishing in one container.

2. Description of the Prior Art

Partitioned storage containers are known in the art. For example, U.S. Pat. No. 4,628,628 (Burin, C., Dec. 16, 1986) discloses a fishing equipment holder with a elongated, cylindrical body with notched circular brackets running around the circumference. Fishing rods can be placed in the notches and secured by means of a rotatable, rigid outer band that maintains the rods within the equipment holder and an inner elastic band that secures the rods against the outer band. The patent shows that rods and reels are contained externally and therefore not protected. By contrast the instant invention provides a protective shell to prevent damage to tip-ups and their reels.

U.S. Pat. No. 5,207,321 (Jones, E., Jun. 23, 1992) discloses a portable storage device comprising a base having an upright forward wall, an upright panel supported on the base and a storage surface on the base between the forward wall and the panel. The forward wall is shorter than the panel allowing access to the storage surface. An elastic band encircles the panel to prevent stored items from falling over forward wall. The patent shows that stored items are contained externally and therefore not protected. By contrast the instant invention provides a protective shell to prevent damage to stored material.

U.S. Pat. No. Des. 382,707 (Wang, J., Aug. 26, 1997) discloses a golf bag with partitions for clubs. The patent does not show a cover, a reel retaining flange or a method of drainage. The instant invention provides all of the above.

SUMMARY OF THE PRESENT INVENTION

A primary object of the present invention is to provide an organized means of storing and carrying all the equipment necessary for ice fishing with tip-ups in one convenient container.

Another object is to provide a partitioned storage tube for tip-ups and other ice fishing accessories that has compartments for a plurality of tip-ups and other ice fishing accessories and a housing to protect tip-up reels.

An additional object is to provide a partitioned storage tube that is versatile enough to accommodate tip-ups of various lengths and reels of different sizes.

A further object is to provide a partitioned storage tube with a safe place to put the hooks attached to the tip-ups to prevent the user from harm.

A still further object is to provide a partitioned storage tube that can also act as a stool when stood on end.

Yet another object is to provide a partitioned storage tube that is lightweight, simple and easy to use.

A still further object is to provide a partitioned storage tube that is economical in cost to manufacture and use.

Additional objects of the present invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims. dr

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DETAILED DESCRIPTION OF THE PREFERRED EMBODIMENTS

Figure 1:
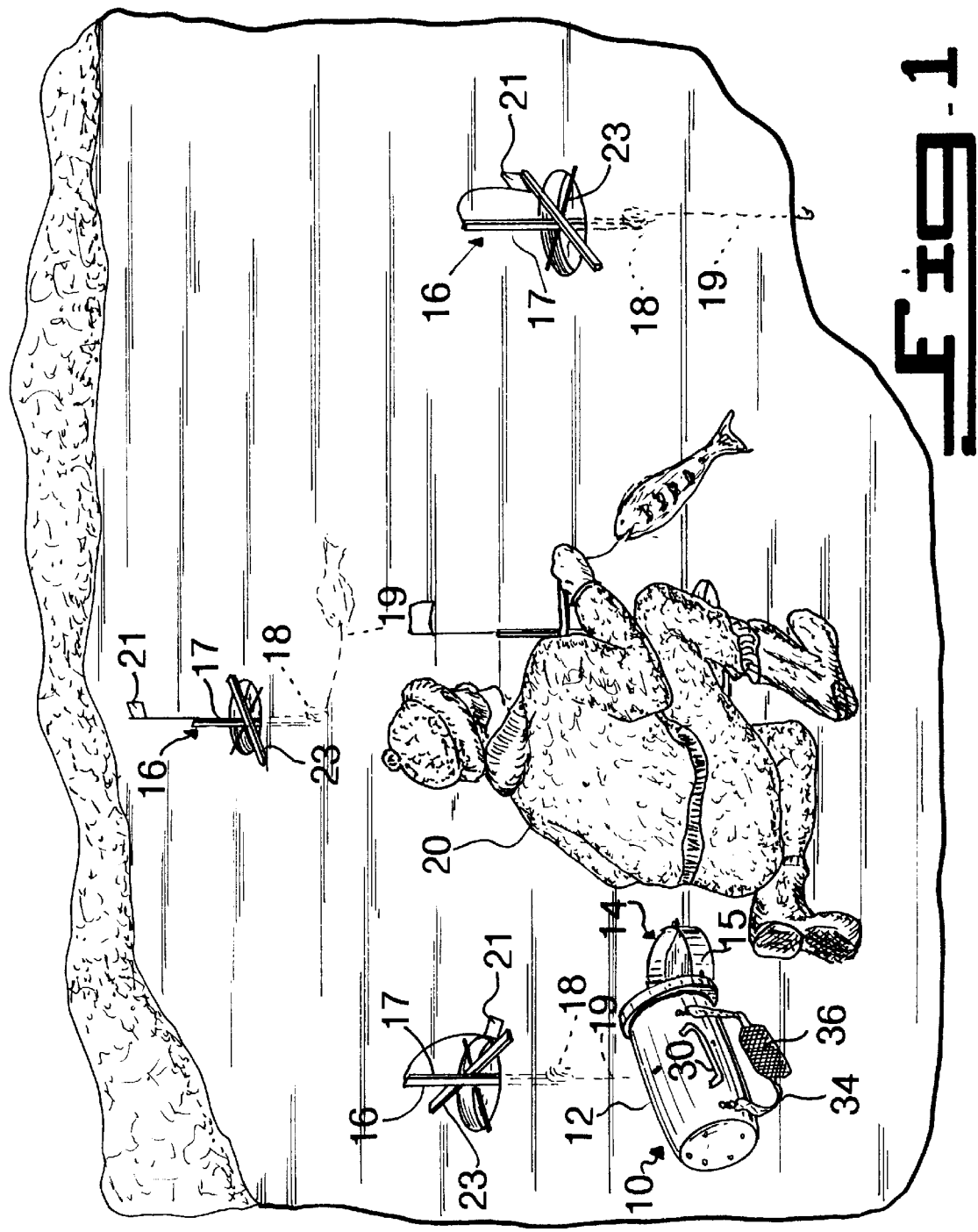
FIG. 1 is a perspective view of a person ice fishing using several tip-ups and the instant invention.
Figure 2:
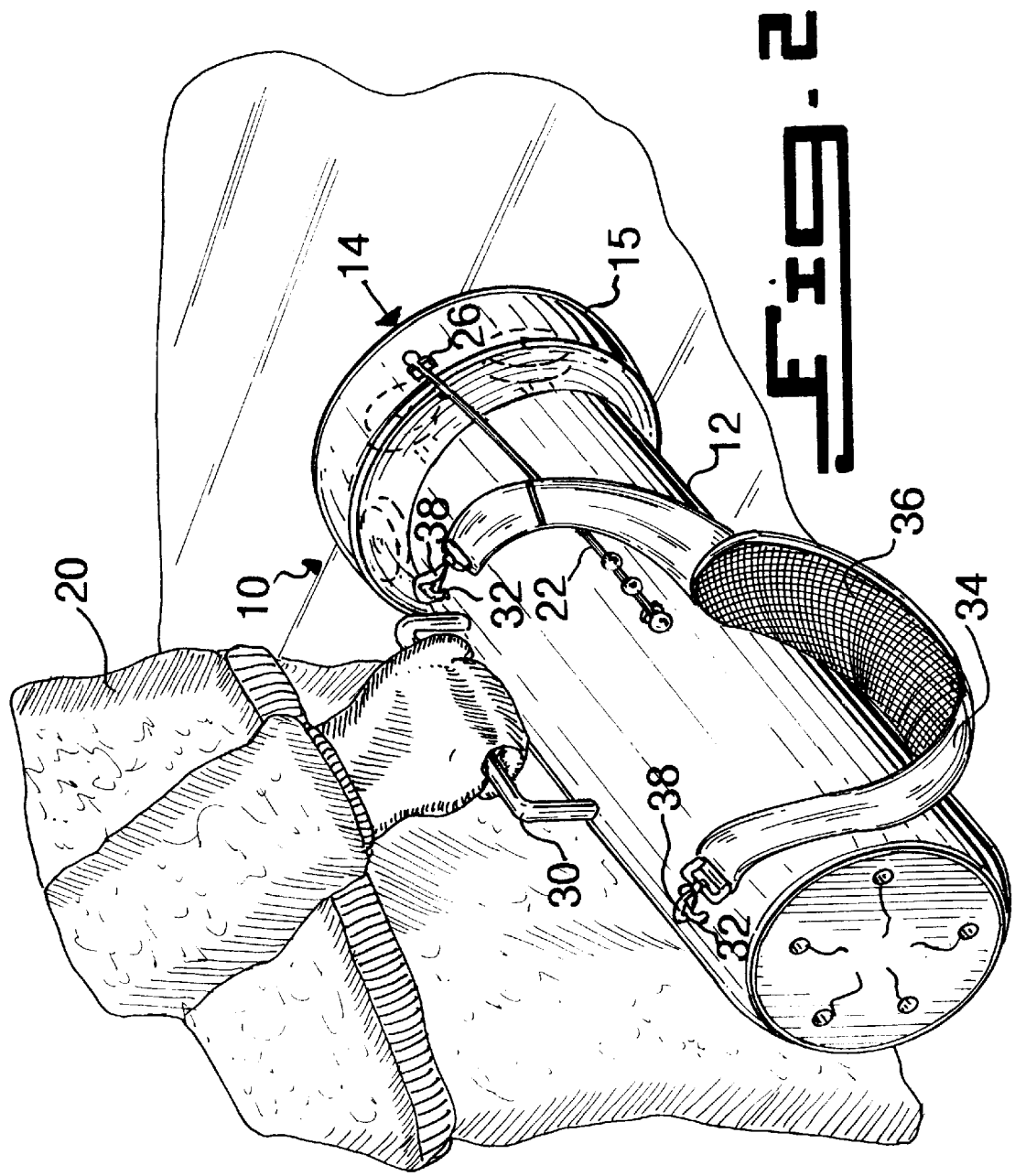
FIG. 2 is a perspective view, taken from FIG. 1 as indicated, of the instant invention.
Figure 3:
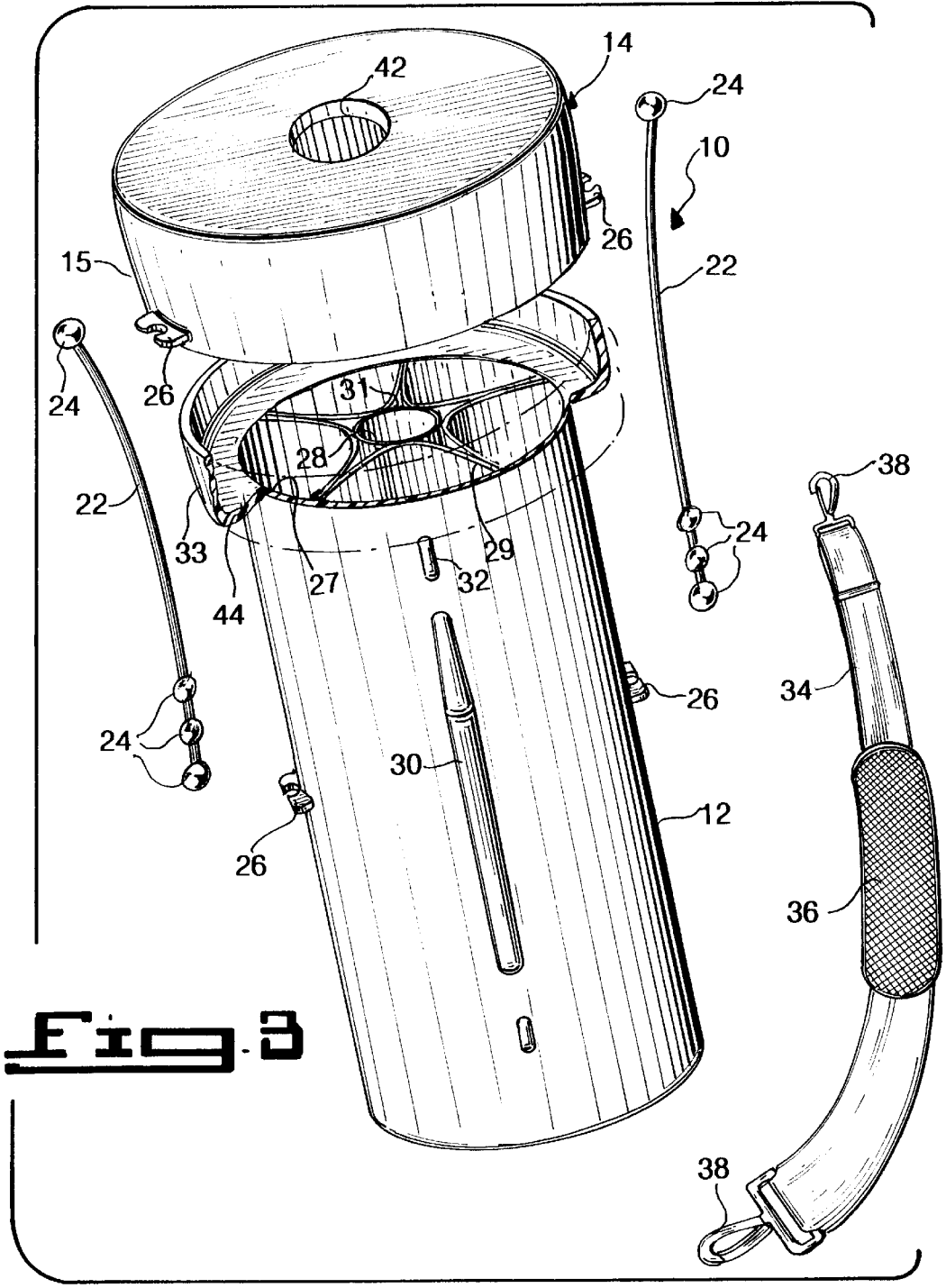
FIG. 3 is an exploded perspective view of the instant invention showing the body, the cover, the cover-securing elastic straps and a handle.
Figure 4:
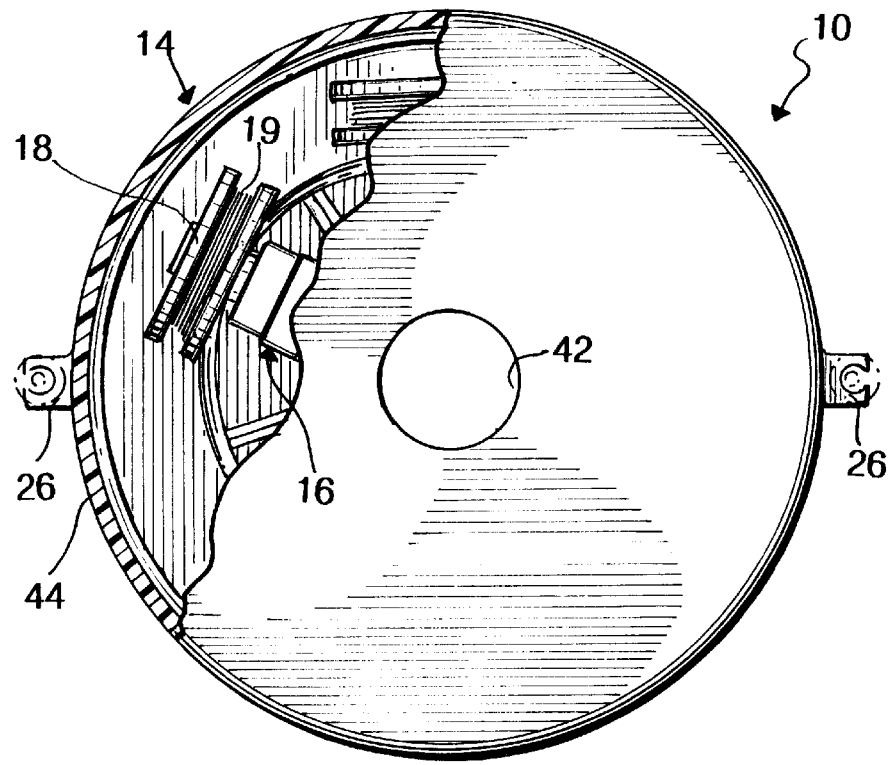
FIG. 4 is a top view of the cover of the instant invention with parts broken away and in section.
Figure 5:
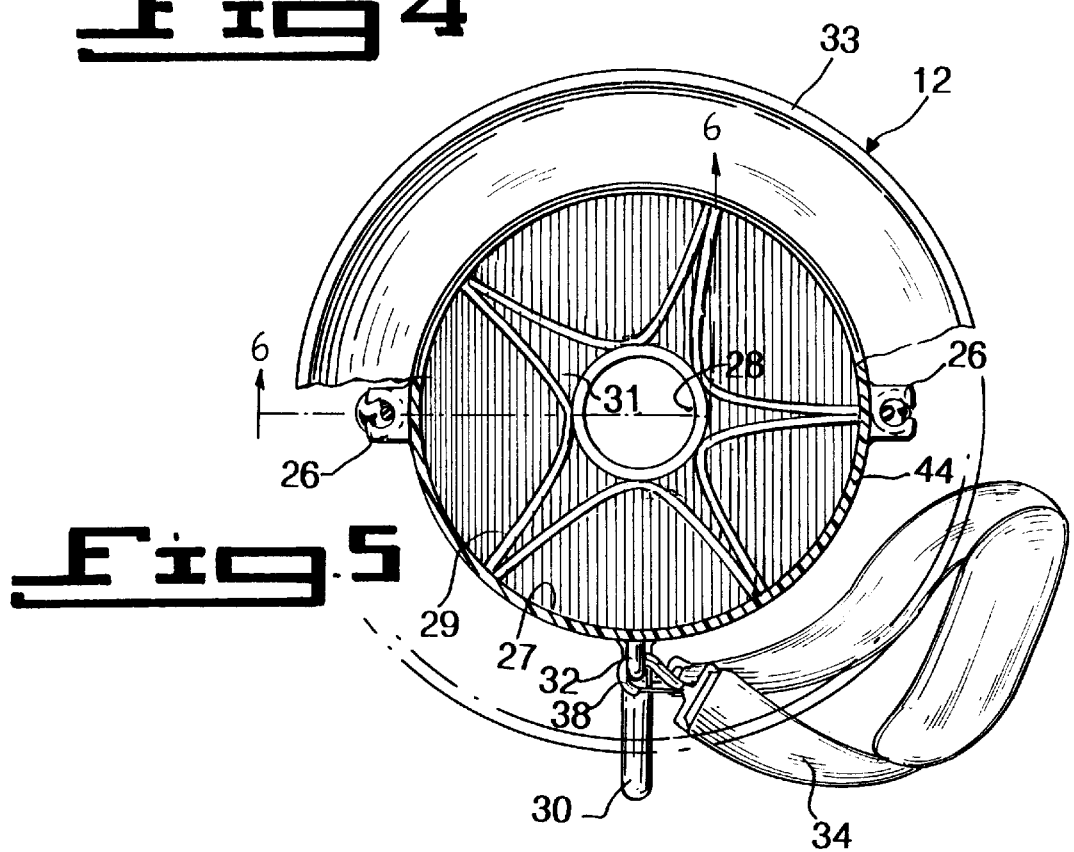
FIG. 5 is a top view of the body of the instant invention.
Figure 6:
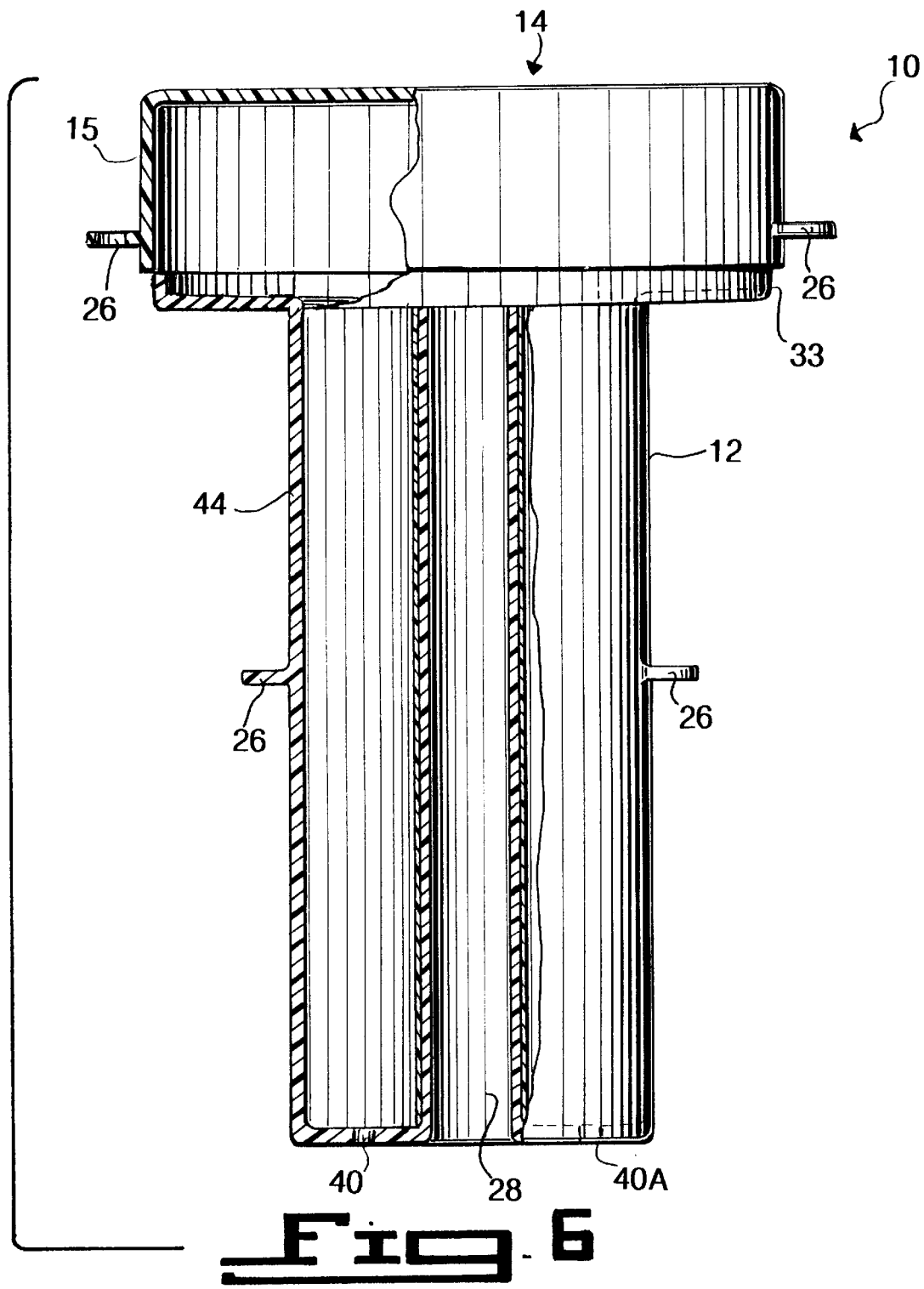
FIG. 6 is a side view of the instant invention with parts broken away and in section.

Turning now descriptively to the drawings, in which similar reference characters denote similar elements throughout the several views, FIG. 1 illustrates a fisherman 20 ice fishing using a plurality of tip-ups 16 and a partitioned storage tube for tip-ups and other ice fishing accessories 10. FIG. 2 shows the fisherman 20 with all his gear packed in the partitioned storage tube for tip-ups and other ice fishing accessories 10 and easily carrying it by the handle 30.

A shoulder strap 34 provides another convenient means of handling the partitioned storage tube 10. The shoulder strap 34 is fabricated from a strong flexible material such as canvas or nylon preferably with a padded section 36 where the strap would rest on a person's shoulder. The shoulder strap 34 has locking clasps 38 at each end that fasten to the anchor hooks 32 affixed to body 12 allowing the user to remove or attach shoulder strap 34 as desired.

FIGS. 3 through 6 illustrate the details of the partitioned storage tube for tip-ups and other ice fishing accessories 10 comprising a body, of which the inside is partitioned into five tip-up storage compartments 27, five subcompartments 31, an interior compartment 28 for storing items such as an ice spoon or jig pole, and a tip-up reel retaining flange 33.

The tip-up 16 is placed into the tip-up storage compartment 27 with the tip-up reel 18 resting on the tip-up reel retaining flange 33. Any hooks or lures that may be attached to the line on the tip-up reel 18 can be placed in one of the subcompartments 31 for safety and to prevent tangling.

When all of the tip-ups 16 are stored, the cover 14 can be put on by sliding the cover flange 15 over the tip-up reel retaining flange 33 of the body 12. The cover 14 is then secured by means of an elastic strap 22 that has a locking bearing 24 on one end and three locking bearings 24 spaced linearly on the other end. The exterior side of the cover flange 15 has a pair of two prong receiving latches 26 located 180 degrees apart and the body 12 has two corresponding receiving latches 26. The cover 14 is fastened to the body 12 by placing a locking bearing 24 above the receiving latch 26 of the cover 14 and running the elastic strap 22 between the two prongs and then fastening the other end of the elastic strap 22 to the corresponding receiving latch 26 of the body 12 in the same manner. The second strap is attached similarly on the other side. The depth of the reel retaining flange 33 can be adjusted for different size tip-up reels 18 by sliding the cover 14 over the retaining flange 33 to whatever point the reel 18 will allow and fastening the elastic strap 22 to the receiving latch 26 by using one of the three consecutive locking bearings 24.

The cover 12 has an access opening 42 leading to the interior container that allows the partitioned storage tube to hold longer items such as a jig pole or ice spoon.

The bottom of the body 12 has a drain aperture 40 corresponding with each tip-up storage compartment 27 to allow drainage of any moisture coming from used tip-ups 16.

The partitioned storage tube 10 is made from a strong, durable, lightweight plastic 44, preferably brightly colored. The partitioned storage tube 10 should be sturdy enough for the user to sit on when placed in an upright position with the cover on. The bottom of the partitioned storage tube could also have gripping studs or a textured bottom 40a to reduce slipping on the ice.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying the current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A partitioned storage tube for tip-ups, their respective reels and other ice fishing accessories comprising:
    a) a body, including partitioned storage compartments, a closed end and an open end, said body being elongated and generally cylindrical;
    b) a cover;
    c) means for securing the cover to the body;
    d) a tip-up reel retaining flange having a first segment extending radially around said open end and a second segment extending upwardly from an outer circumference of the first segment;
    e) an open top interior container running longitudinally and centrally through the full length of said body up to and terminating at the same level as said flange; and
    f) a series of u-shaped partitions that run longitudinally from said body to said interior container and return to the body defining a plurality of compartments that are wider towards the body and an equal number of sub-compartments formed by the gaps between said partitions and said interior container, said compartments and subcompartments extending the full length of said body up to said flange.

2. A partitioned storage tube as defined in claim 1, wherein said closed end of body has a drain aperture placed centrally in relation to each said storage compartment.

3. A partitioned storage tube as defined in claim 2, wherein said cover has a flange to fit over said open end of said body.

4. A partitioned storage tube as defined in claim 3, wherein said cover is secured to said body by at least one elastic strap.

5. A partitioned storage tube as defined in claim 4, wherein said cover has an opening aligned with said interior container.

6. A partitioned storage tube as defined in claim 5, wherein said partitioned storage tube may be used as a stool when stood upright with the cover on.

7. A partitioned storage tube as defined in claim 6, wherein said closed end of said body has means to reduce slippage when used as a stool on ice.

8. An ice fishing accessory storage tube for, and in combination with one or more tip-ups each tip-up having a reel, a line, and a hook, and other ice fishing accessories, comprising:
    a) a cylindrical body having a closed bottom end and an open top end, with an outwardly extending flange surrounding said open top end sufficiently wide to accommodate the reel of said tip-up resting on said flange with an outer wall extending up from said flange;
    b) the interior of said body having a plurality of compartments extending the length of said body up to said flange containing one or more tip-ups not in contact with each other, with the reel of each tip-up resting on said flange;
    c) a plurality of sub-compartments located between said compartments, the hook of each said tip-up located in a sub-compartment separated from the hook of any other tip-up within said body; and
    d) means for covering the open end of said body fully enclosing said open end and any tip-up in said body including said flange, outer wall and any reel on said flange.

9. The ice fishing accessory storage tube of claim 8 having a drain aperture on the bottom of each of said compartments.

10. The ice fishing accessory storage tube of claim 8 having means on the outside of said bottom end to reduce slipping on the ice.

11. The ice fishing accessory storage tube of claim 8 in which said compartments are formed by a plurality of u-shaped partitions that run longitudinally from said body to the interior and return to body defining said compartments which are wider towards said body, an inner compartment formed by a cylindrical member extending centrally through said body between said u-shaped partitions the full length of said body up to said flange, said covering means having an opening aligned with said inner compartment so that said storage tube will accommodate a fishing pole extending into and out of said inner compartment when said covering means is on said storage tube.

* * * * *